United States Patent [19]
Aaron

[11] 3,809,919
[45] May 7, 1974

[54] CONTROL SYSTEM FOR AUTOMATIC VEHICLE WASHING INSTALLATION

[75] Inventor: Albert Glenn Aaron, Chesterfield, Mo.

[73] Assignee: Passpoint Corporation, Maryland Heights, Mo.

[22] Filed: Nov. 24, 1972

[21] Appl. No.: 309,101

[52] U.S. Cl. .................. 307/41, 15/DIG. 2, 134/45
[51] Int. Cl. ............................................. B60s 3/04
[58] Field of Search ................. 134/45; 15/DIG. 2; 200/38 BA; 307/41, 141

[56] References Cited
UNITED STATES PATENTS
3,391,700  7/1968  Lawter ........................... 15/DIG. 2
3,627,093  12/1971  Greenwald ........................... 134/45

Primary Examiner—Robert K. Schaefer
Assistant Examiner—William J. Smith
Attorney, Agent, or Firm—Gravely, Lieder & Woodruff

[57] ABSTRACT

A control system for an automatic car wash installation includes position switches which are operated in sequence by vehicles passing through the installation. The position switches are connected to at least two programmers, which are actually stepping switches, and these programmers are interconnected such that one programmer is stepped by the first vehicle entering the wash installation and closing the position switches therein and the other programmer is stepped by a subsequent vehicle which enters the wash installation while the first vehicle is still in it. Thus, the different programmers track different vehicles through the wash installation. The programmers have switches which are opened and closed according to a predetermined schedule, and corresponding switches on the programmers are connected to various components of the car wash installation to operate those components in accordance with the predetermined schedule as the position switches are tripped. One of the components is a wax applicator which is in circuit with corresponding programmer switches as well as with the contacts of a relay which may be closed only when the car enters the installation, so that the condition of the relay determines whether or not the vehicle will be waxed near the end of the installation. Thus, the relay provides the circuit with memory logic.

11 Claims, 4 Drawing Figures

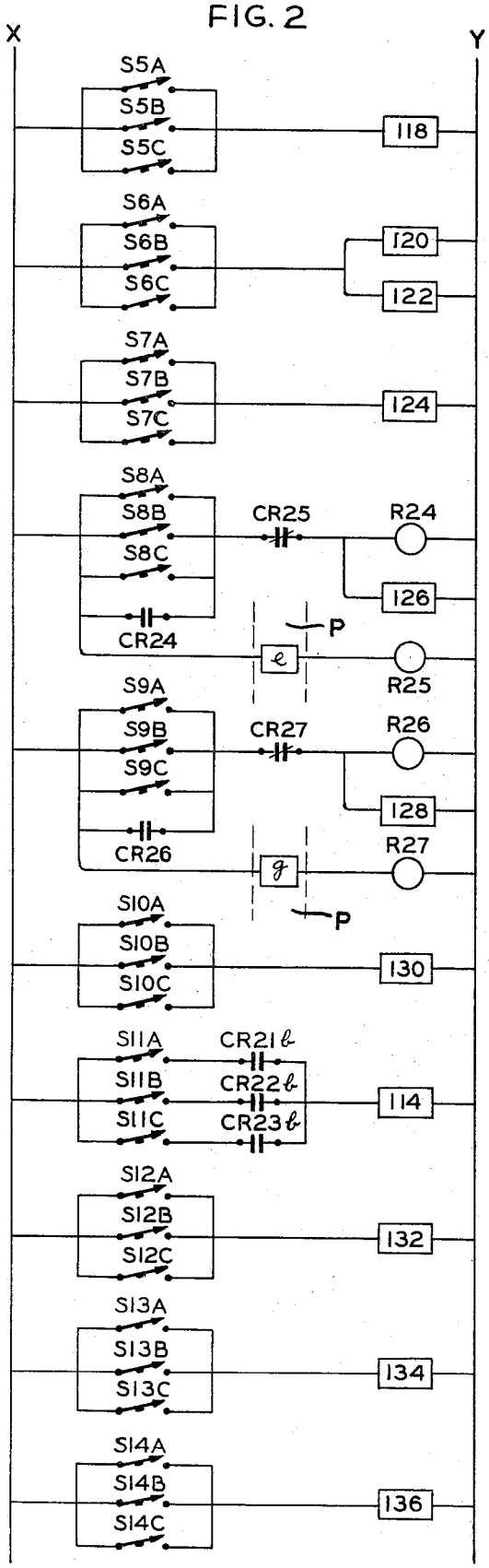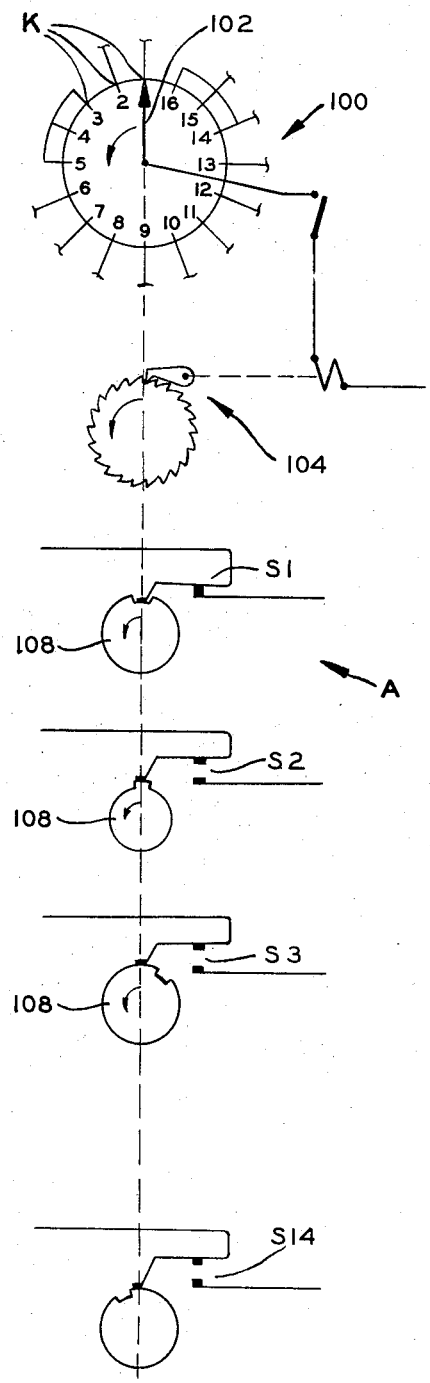
FIG. 2
FIG. 3

FIG. 4

| FUNCTION | SWITCH NO. | \multicolumn{16}{c}{PROGRAMMER POSITION} |

| PROGRAMMER SWITCHING SCHEDULE |||||||||||||||||||
|---|---|---|---|---|---|---|---|---|---|---|---|---|---|---|---|---|---|
| FUNCTION | SWITCH NO. | 1 | 2 | 3 | 4 | 5 | 6 | 7 | 8 | 9 | 10 | 11 | 12 | 13 | 14 | 15 | 16 |
| ARM | 1 | ■ | □ | □ | □ | □ | □ | □ | □ | □ | □ | □ | □ | □ | □ | □ | □ |
| INTERLOCK | 2 | □ | ■ | ■ | ■ | ■ | ■ | ■ | ■ | ■ | ■ | ■ | ■ | ■ | ■ | ■ * | □ |
| WAX SELECTION | 3 | □ | ■ | □ | □ | □ | □ | □ | □ | □ | □ | □ | □ | □ | □ | □ | □ |
| WAX RESET | 4 | ■ | □ | ■ | ■ | ■ | ■ | ■ | ■ | ■ | ■ | ■ | ■ | ■ | □ | ■ | ■ |
| BYPASS VALVE | 5 | □ | □ | ■ | ■ | ■ | ■ | ■ | ■ | ■ | ■ | ■ | ■ | ■ | □ | □ | □ |
| WASH WATER AND SOAP | 6 | □ | □ | ■ | ■ | ■ | ■ | ■ | □ | □ | □ | □ | □ | □ | □ | □ | □ |
| TOP BRUSH | 7 | □ | □ | ■ | ■ | ■ | ■ | □ | □ | □ | □ | □ | □ | □ | □ | □ | □ |
| LEFT BRUSH | 8 | □ | □ | □ | □ | □ | □ | ■ | □ | □ | □ | □ | □ | □ | □ | □ | □ |
| RIGHT BRUSH | 9 | □ | □ | □ | □ | □ | □ | □ | ■ | □ | □ | □ | □ | □ | □ | □ | □ |
| RINSE WATER | 10 | □ | □ | □ | □ | □ | □ | □ | □ | ■ | ■ | ■ | □ | □ | □ | □ | □ |
| WAX | 11 | □ | □ | □ | □ | □ | □ | □ | □ | □ | ■ | ■ | ■ | □ | □ | □ | □ |
| AIR HEATER | 12 | □ | □ | ■ | ■ | ■ | ■ | ■ | ■ | ■ | ■ | ■ | ■ | ■ | □ | □ | □ |
| AIR BLOWER | 13 | □ | □ | □ | □ | □ | □ | □ | □ | □ | □ | □ | ■ | ■ | ■ | ■ | □ |
| GO LIGHT | 14 | □ | □ | □ | □ | □ | □ | □ | □ | □ | □ | □ | □ | □ | □ | □ | ■ |

□ OPEN SWITCH
■ CLOSED SWITCH

*FOR PROGRAMMERS A AND B ONLY

CONTROL SYSTEM FOR AUTOMATIC VEHICLE WASHING INSTALLATION

BACKGROUND OF THE INVENTION

This invention relates to car wash installations and, more particularly, to a control system for operating the equipment in such installations.

The typical automatic car wash installation has a conveyor which engages one of the wheels on the automobile to be washed and pulls or pushes that automobile past water jets, rotating brushes, hot air blowers and the like so that the car is completely washed and dried by the time it reaches the end of the conveyor. Many installations have wax applicators for applying a coat of liquid wax prior to the drying operation if the customer purchases this service in addition to the wash.

In some installations the various equipment is operated by switches connected to wands or feelers which are deflected by the automobile as it passes. In such installations, there is no way of tracking a selected vehicle through the installation to insure that it receives additional service such as an application of wax. On the contrary, an attendant must be present to operate the wax applicator when the vehicle reaches the appropriate position within the installation. Consequently, such installations are not fully automated.

In other installations the washing and drying equipment is controlled by a timing device which is synchronized with the conveyor. Thus, the conveyor must operate at a preselected speed to remain synchronized with the washing equipment. Moreover, if the conveyor becomes disengaged with the car wheel, the washing and drying sequence is completely disrupted. Furthermore, these installations likewise do not have the capacity to provide additional services to selected automobiles on a fully automated basis.

SUMMARY OF THE INVENTION

One of the principal objects of the invention is to provide a control system for an automatic car wash installation, which control system correlates the operation of the car wash equipment to the position of the automobile irrespective of the speed of the automobile through the installation. Another object is to provide a control system of the type stated which has a built in memory logic for providing additional services to selected automobiles. A further object is to provide a control system of the type stated which has the capability of washing and providing other services to a plurality of automobiles simultaneously. These and other objects and advantages will become apparent hereinafter.

The present invention is embodied in a control system having programmers which track different vehicles through car wash installations at the same time and operate the washing and other equipment of the installation according to a predetermined schedule. It also resides in a memory circuit for providing additional services which are selected before they are actually provided. The invention also consists in the parts and in the arrangements and combinations of parts hereinafter described and claimed.

DETAILED DESCRIPTION OF THE DRAWINGS

In the accompanying drawings which form part of the specification and wherein like numerals and letters refer to like parts wherever they occur:

FIG. 2 is a circuit diagram showing the remainder of the circuitry;

FIG. 3 is a schematic view of a programmer used in the present invention; and

FIG. 4 is a switch schedule for the programmers.

DETAILED DESCRIPTION

Figure 1:
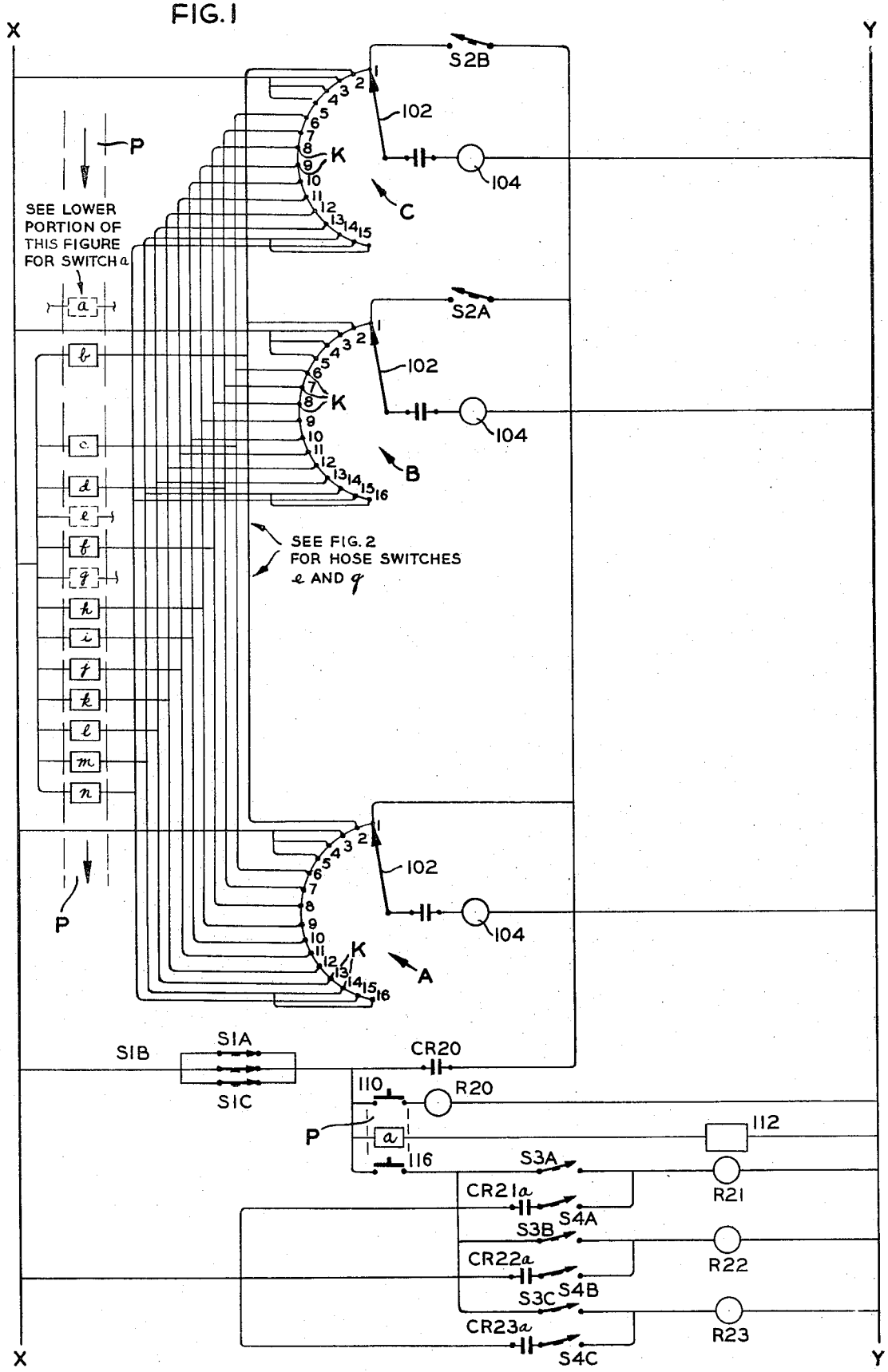
FIG. 1 is a circuit diagram showing a portion of the circuitry for the control system of the present invention.

The control system of the present invention may be utilized in automatic car wash installations of current design and manufacture. The typical installation has a conveyor which advances automobiles along a path P (FIG. 1) leading to and past various washing and drying equipment. The conveyor has rollers which normally move beneath the path P followed by the automobiles wheels. However, after an automobile is driven onto the path P one of the rollers is elevated to the path P at a position behind one of the automobile wheels. When this roller engages the wheel, it advances the automobile along the path at a uniform velocity. Such a conveyor is illustrated in U.S. Pat. No. 3,554,132.

The washing equipment includes a wash water and soap spray for wetting the automobile with a soap solution, and this solution is delivered through a valve. Next, the automobile encounters top, left, and right brushes in that order as it is advanced, all these brushes being of the rotary variety. The top brush rotates about a horizontal axis and swings upwardly and downwardly to enable it to wash the hood, windshield, roof, rear window and rear deck of the automobile. The left brush rotates about a vertical axis and swings laterally with respect to the path to enable it to wash the front, the left side, and the rear of the automobile. The right brush also rotates about a vertical axis and swings laterally, but is staggered with respect to the left brush, so that it will not interfere with the left brush. The right brush washes the front, the right side, and the rear of the automobile. All three brushes are revolved by rotary type hydraulic motors which are controlled by valves.

Following the brushes, the automobile passes through a rinse which sprays rinse water to remove the soap solution and dislodged dirt from the automobile. The rinse water is also delivered through a valve. At the same time liquid wax may or may not be applied to the automobile, depending whether or not the pump of a wax applicator is energized. Finally, the automobile passes through a drying tunnel where hot air is blown on the vehicle. The drying tunnel operates in conjunction with two major components, namely, a blower which is powered by an electric motor and a fuel burner which is located in the airstream delivered by the blower for heating that airstream. The fuel is delivered to the burner through a solenoid actuated valve.

The foregoing equipment is conventional and is therefore not illustrated or described in detail.

Referring now to the drawings, the control system includes a plurality of control hoses which are positioned in succession along the path P taken by the wheels of the automobile as it passes by the washing, drying and other equipment. The control hoses are connected with position or hose switches $a, b, c, d, e, f, g, h, i, j, k, l, m$ and $n$ (FIG. 1) with the first hose being connected to the switch $a$, the second to the switch $b$, etc. Hence, the switches *a* to *n* are closed in the order enumerated as the automobile is advanced along the path P.

The control system, of which the hose switches *a* to *n* are a part, derives its power from mains X and Y and it is preferable to have 110 volts AC across these mains. The hose switches *b* to *n* are connected directly to the main X.

In addition to the hose switches *a* to *n*, the control system has three programmers A, B, and C, each of which is identical in construction but is connected into the circuit slightly differently. Each programmer A, B, and C is actually a stepping switch which includes (FIG. 3) a tap switch 100 having a wiper 102 and a plurality of contacts K (the designations K1, K2, and K3 indicate the first, second, third etc., contacts relative to the starting position for the wiper) which are successively contacted by the wiper 102 as it moves incrementally by a rotary solenoid 104. Moreover, the solenoid 104 is connected in series with the wiper 102 so that each time current flows through the contact K on which the wiper 102 is positioned, the wiper 102 will step to the next contact K. The rotary solenoid 104 also indexes a drum having a plurality of cams 108 on it and each cam 108 operates a separate switch S (the designations S1, S2, S3, etc., indicate the first, second, third, etc., switches within a programmer A, B or C). Thus, as the wiper 102 moves from one contact K to the next, the switches S are opened and closed, the program of each switch S depending on the configuration of the cam 108 with which it is associated (see FIG. 4).

Some programmers of current manufacture may be programmed by the purchaser simply by inserting pins into the cams thereof. Others are programmed by breaking segments out of the cams. Switching devices suitable for use as the programmers A, B and C are manufactured by the Eagle Signal Division of Gulf & Western, Industries, Davenport, Iowa, and are designated as the MT series of programmers.

The schedule for each stepping switch A, B, and C is set forth in FIG. 4 along with the function of the switch S therein. Thus, by referring to FIG. 4 it is apparent that switch S1 for each programmer A, B, C (the designation S1A means the first switch S of programmer A; S1B means the first switch for programmer B, etc.) serves to arm the system, and that this switch is closed when the wiper 102 is in its first position, that is when it is on the first contact K1, but is open for the remaining programmer positions, that is as the wiper passes over the remaining contacts K2 to K14. Switch S2, on the other hand serves as an interlock and is open when the programmer A, or B with which it is associated is in its first position and is closed when its programmer is in the remaining positions. However, the interlock switch S2C on the programmer C serves no function as will be apparent from the subsequent discussion.

The switches S1A, S1B and S1C of the three programmers A, B and C are connected (FIG. 1) in parallel, and the parallel combination is connected with a wash button 110 and a relay R20 which are in series. The combination in turn is connected across the mains X and Y.

The parallel grouping of switches S1A, S1B, and S1C is also connected with the hose switch *a* and a mechanism 112 for elevating a roller from the conveyor to the path followed by the car wheels. The switch *a* and elevating mechanism 112 are connected in series to the main Y. Thus, when one of the switches S1A, S1B and S1C is closed and a car wheel passes over the first control hose, the hose switch *a* will close and cause the mechanism 112 to elevate a conveyor roller to a position behind the wheel. This roller will thereafter engage the car wheel and push it and the automobile along the path P extending through the car wash installation.

The contact K1 on the tap switch 100 of the programmer A is electrically connected to the parallel combination of switches S1A, S1B, and S1C, through the contacts CR20 of the relay R20. These contacts are normally open and close only when the relay R20 is energized. The contact K1B of the programmer B is connected to the parallel grouping of switches S1A, S1B and S1C, not only through the contacts CR20, but also through the second switch S2A of the programmer A, the switch S2A being interposed between the relay contact CR20 and the contact K1B. The contact K1C of the programmer C is connected to the parallel grouping of switches S1A, S1B and S1C through the relay contacts CR20 and also through the second switch S2B on the programmer B.

As the car wheel passes over the control hose for the hose switch *a* each programmer A, B, and C is in its first position, that is its wiper 102 is on the contact K1. Shortly after the hose switch *a* is closed a conveyor roller engages the car wheel and begins to advance the car through the wash installation. From the switch schedule (FIG. 4) it is apparent that at this time the three parallel switches S1A, S1B and S1C are closed, but that the switches S2A and S2B which lead to the contacts K1B and K1C, respectively, are open. An attendant should depress the wash button 110 as the car begins to advance, and when it is pushed the relay R20 is placed across the mains X and Y and is thereby energized, closing its contacts CR20. The closure of the contacts CR20 places the rotary solenoid 104 of the programmer A across the mains X and Y through the contact K1A and wiper 102, and this causes the wiper 102 of the programmer A to step to the contact K2A, that is to its 2d position. The programmer B is not energized since the circuit to the rotary solenoid 104 thereof is broken at the switch S2A which is open when the programmer A is in its first position. Likewise, the programmer C is not energized, for the circuit to its rotary solenoid 104 is broken at the switch S2B which is open when the programmer B is in its first position.

However, once the stepping switch A moves to its 2d position, the switch S2A will close and remain closed during the remaining positions. During that time the operation of the wash button 110 will energize the contact K1B of the programmer B, causing it to step over to its 2d position. The second closure of the button 110 will not affect the programmer A since its wiper 102 has already left the contact K1A, nor will it affect the programmer C since its contact is K1C is isolated from the main X by the second switch S2B of the programmer B. It will be recalled that the switch S2B does not close until the programmer B reaches it 2d position. Now when the wash button 110 is depressed a third time the contact K1C on the programmer C is energized through the closed switch S2B of the programmer B and the programmer C moves to its 2d position. Thus, the switch S2A serves to interlock the wash button 110 and the programmer B and the switch S2B serves to interlock the wash button 110 and the programmer C. The interlocking feature enables the programmers A, B and C to be energized in succession by the single wash button 110 which in turn enables each programmer to track or more accurately to control the wash of a separate automobile as it passes through the car wash installation.

Returning now to programmer A, that programmer while in its second position closes switches S3A and S4A (see FIG. 4) which forms part of the memory circuit for a liquid wax applicator 114. The switch S3A is interposed between a wax selector button 116 and a two pole relay R21. The button 116 is also connected to the parallel grouping of switches S1A, S1B and S1C which in turn are connected with the main X, while the relay R21 is connected with the main Y. The switch S4A has its one pole connected to the line interconnecting the switch S3A and the relay R21 and its other pole connected to one set of relay contacts CR21a of the relay R21. These contacts CR21a are in effect interposed between the main X and the switch S4A and are normally open. The other set of relay contacts CR21b for the relay R21 is associated with the switch S11A of the programmer A (FIG. 2). The switches S3B and S4B are connected to a like manner with a double pole relay R22 having contacts CR22a and CR22b, while the switches S3C and S4C of the programmer C are connected in a like manner with a double pole holding relay R23 having contacts CR23a and CR24b.

The other contacts CR21b, CR22b, and CR23b (FIG. 2) of the relays R21, R22 and R23 are connected in series with the switches S11A, S11B and S11C, respectively, and the three series groupings so formed are connected in parallel. The parallel grouping in turn is connected in series the liquid wax applicator 114.

Assuming that one car has entered the car wash installation and that the wash button 110 has been depressed, in which case the wiper 102 for the programmer A will be on the second contact K2A, that is the programmer A will be in its second position, if it is desired to apply liquid wax to the car as it advanced through the car wash installation, the wax button 116 should be depressed at this time. When the wax button 116 is depressed, current flows through the relay R21, since the switches S1B and S1C are closed as is the switch S3A when the programmer A is in its second position. This energizes the relay R21 which closes its relay contacts CR21a and CR21b. The wax applicator 114 however, remains inoperative since the circuit to it is broken at the switches S11A, S11B and S11C.

As the car continues to advance its leading wheel will pass over the control hose connected with the hose switch b which in turn is between the main X and the contact K2A of the programmer A as well as the contacts K2B and K2C of the programmer B and C respectively. Since the wiper 102 of the programmer A is on the contact K2A, the rotary solenoid 104 will be energized and will cause the programmer A to step to its third position. When the wiper 102 reaches contact K3A, the programmer A will step automatically to and through the fourth and fifth positions, since the contacters K3A, K4A, and K5A are all connected directly to the main X. The wiper 102 will come to rest on the contact K6A, at which time the programmer A will be in its 6th position. The closure of the hose switch b, however, does not affect the programmer B and C, for their wipers 102 remain on the contacts K1B and K1C, respectively, that is the stepping switches B and C remain in their first positions.

When the programmer A moves into its third position, the switch S3A opens but the relay R21 remains energized since the switch S4A is closed in the third position as well as all other positions except the 15th position. Thus, the relay contacts CR21a and CR21b remain closed as the car washing operation progresses.

In time, the programmer A will move into its 10th position at which time the switch S11A will close and complete the circuit through the wax applicator 114, and when this occurs liquid wax is pumped onto the automobile. The wax applicator 114 remains energized until the programmer A reaches its 15th position, at which time the switch S11A opens and deactivates the applicator 114. Also, in the 15th position the switch S4A opens and this deactivates the relay R21 and opens the contacts CR21a and CR21b. In other words, it resets the relay R21. Thus, the switches S3A, 3A and S11A coupled with the relay R21 provide memory logic for the programmer A as it follows a vehicle through the car wash installation.

The programmers B and C are provided with the same memory logic. While the memory logic has been described in conjunction with a wax applicator, it may also be used in conjunction with other car wash equipment such as special activators for raising the top brush to enable it to wash police and other vehicles with protuberances on the roofs thereof. In general, the memory logic is utilized to provide additional services.

The switches S5A, S5B and S5C of the programmers A, B and C, respectively, are connected in parallel, and the parallel grouping in turn is connected in series with a solenoid operated hydraulic by-pass valve 118. Hence, when anyone of the switches S5A, S5B, and S5C is closed the valve 118 will be open. Each switch S5 is open in the first or arming position for its programmer, but is closed in the remaining positions. Valve 118 will by-pass oil back to the tank, thus all hydraulic motors will stop.

The switches S6A, S6B and S6C are also grouped in parallel so that when anyone of them is closed a soap pump 120 and a wash water valve 122 will be energized. These components are energized when any one of the programmers A, B or C reaches its third position, and the programmers A, B or C only reach their third position when a car passes over the control hose associated with the hose switch b. The pump 120 and valve 122 remain energized until the programmer reaches its 14th position.

The switches S7A, S7B, and S7C are also grouped in parallel to open a solenoid valve 124 which directs compressed air to the brush for washing the top of the vehicle. This valve opens at the third position for any one of the programmers A, B or C, that is when a car passes over the control hose associated with the hose switch b, and remains closed until the 9th position, which is when the car passes over control hose f.

The left brush is operated by a pneumatic motor which in turn is controlled by a solenoid valve 126 connected in parallel with a relay R24. The parallel grouping of the valve 126 and relay R24 is connected in series with another parallel grouping containing the three switches S8A, S8B, and S8C, as well as the contacts CR24 of the relay 24. Interposed between the two parallel groupings are the normally closed contacts CR25 of a relay R25 which is connected in series with the hose switch e. The switch S8A closes when the first car passes over the control hose associated with the hoses switch c, for when this occurs the wiper 102 moves from contact K6A to contact K7A, that is the programmer A moves to its 7th position. Only in the 7th position is the switch S8A closed, and when it is closed current flows through the closed contacts CR25 and through the relay R24 and the solenoid valve 126. The valve 126 energizes the left brush motor while the relay R24 closes the contacts CR24 so that the left brush will remain in operation even after the switch S8A opens. Indeed, the brush operates until the car passes over the control hose associated with the hose switch e. When this occurs, the solenoid R25 is energized and it momentarily opens the normally closed contacts CR25 to reset the solenoid R24, that is open its contacts CR25. With the contacts CR25 open the circuit for the left brush is again armed. Note that the hose switch d which moves the programmer to its 8th position precedes the hose switch e which resets the relay R24 of the left brush circuit, for if the switch S8A were closed when the relay R25 is momentarily opened, the relay R24 would merely open and then close again.

The right brush is also operated by a pneumatic motor which is controlled by a solenoid valve 128. That valve 128 is in circuit with the switches S9A, S9B, S9C of a relay R26 having contacts CR26, another relay R27 having normally closed contacts CR27, and the hose switch h, and that circuit is identical to the one in which the valve 126 is located. The switches S9A, S9B and S9C remain closed only while one of the programmers A, B or C is in its 9th position.

The switches S10A, S10B, and S10C are connected in parallel and the parallel grouping is connected in series with rinse water solenoid valve 130, so that when anyone of the switches S10A, S10B and S10C is closed the valve 130 will be energized and rinse water will be directed upon the automobile. The switches S10 are open from the 9th through the 14th positions for their respective programmers A, B and C. Thus, when the first car closes the hose switch f the rinse begins and continues until the car closes the hose switch m.

The switches S12A, S12B, and S12C are in parallel and anyone when closed will energize the solenoid valve 132 which controls the flow of gas to the heater for the blower. The switches S12 close at the third position and remain closed through the 16th position.

The switches S13A, S13B, and S13C are in parallel and when any one of them closes a blower unit 134 is energized. That blower unit 134 directs heated air against the automobile.

The switches S14A, S14B, S14C are connected with a green light 136 such that the light 136 is illuminated when any one of the switches S14 is closed. The switches S14 close only in the 16th position for the programmers A, B and C, and that position is effected by the car closing the hose switch n.

On each programmer A, B and C the contact K14 is connected with the contact K16 so that when the trailing wheel of a car passes over the control hose associated with the hose switch m, the programmer will step back to its first or arm position, in which case the wiper 102 engages the contact K1.

OPERATION

Initially each of the programmers A, B and C is in its first or arm position, in which case the switches S1A, S2A, and S3A will be closed. When a car drives into the car wash installation it will pass over the control hose associated with the hose switch a and close that switch. This activates the conveyor elevating mechanism 112 so that a roller is elevated to a position behind one of the automobile's front wheels to begin moving the automobile along the path through the wash installation. At about the same time the attendant pushes the wash button 110 and causes the programmer A to step from its first or arm position to its second position wherein the wiper 102 thereof is against the contact K2A. The second and remaining positions may be called operating positions. The other programmers B and C remain in their first positions, but the programmer B is now armed since the programmer A when in the second and remaining positions has its switch S2A closed.

If an application of wax is desired in addition to the wash, the wax button 116 is pushed along with the wash button 110. This energizes the relay R21 since in the second position the switch 3A is closed, and the relay R21 in turn closes the contacts CR21a and CR21b. The former have the effect of keeping the relay R21 energized as long as the switch S4A remains closed, which is for all positions except position 15. The latter places the wax applicator 114 in direct series with the switch S11A so that when that switch is closed the wax applicator 114 will be placed across the mains X and Y.

The switch S5A also closes in the second position, thereby opening the by-pass valve which remains open for the remaining positions.

Shortly thereafter the leading wheel of the car crosses the control hose associated with the hose switch b, and when that switch closes the programmer A steps through its 3d, 4th and 5th positions and comes to rest in its 6th position. As this occurs the switch S6A closes, energizing the soap pump 120 and opening the wash water valve 122 so that soapy water is directed onto the car. The switch S6A remains closed through the 13th position. At the same time the switch S7A closes and opens the solenoid valve 124 which controls the top brush. That switch S7A remains closed through the 8th position. In addition, switch S12A energizes the gas valve 132 which directs gas to a burner. The switch S12A remains closed and the burner remains on for the remaining positions.

The programmer steps from position 6 to position 7 when the leading wheel of the car encounters the next control hose and closes the hose switch c. In this position the switch S8A closes, thereby energizing the relay R24 and the solenoid valve 126. The valve 126 opens and directs compressed air to the motor which drives the left brush. The relay R24, on the other hand, closes its contacts CR24 which shunt the closed switch S8A.

As the automobile crosses the next control hose it closes the hose switch d which causes the programmer A to step to position 8. In this position the switch S8A opens, but the left brush continues to operate due to the shunting effect of the closed relay contacts CR24.

In addition, the switch 9A closes in position 8, and this energizes the relay R26 and opens the valve 128 which controls the right brush. The relay R26 when energized closes its contacts CR26 which shunt the closed switch S9A.

Next, the car crosses the control hose associated with the hose switch e and that switch energizes the relay R25 and causes its normally closed contacts CR25 to break momentarily. This in turn de-energizes the relay R24 and its contacts CR24 open. Hence, when the contacts CR25 again close after the car passes over the control hose, the circuit to the valve 126 for the left brush is left interrupted at the switches S8A, S8B, and S8C and the left brush stops rotating.

The car continues on and closes the hose switch $f$ which causes the programmer A to step from position 8 to position 9. In this position, the switch S9A opens, but the valve 128 remains energized due to the shunting effect of the closed relay contacts CR26. Upon reaching position 9, the switch S10A closes which energizes the rinse water valve 130, causing rinse water to be directed upon the car. The flow of rinse water continues until position 15, at which time the switch S10A opens.

Not only does the switch S10A close at position 9, but so does the switch S11A which is associated with the wax circuit. The switch S11A, however, is in series with the relay contact $CR21b$ and consequently the wax applicator 114 will not operate unless the contacts $CR21b$ are closed. The condition of the contacts, $CR21b$, it will be recalled, is dependent on whether or not the wax button 116 was depressed when the programmer A was in its $2d$ position. If it was pressed the contacts $CR21b$ will be closed; if it wasn't, the contacts $CR21b$ will be open. Thus, the circuitry remembers instructions and implements those instructions after they are given. The switch S11A remains closed until position 15.

Thereafter the automobile closes the hose switch $g$ which energizes the relay R27 causing its contacts CR27 to momentarily open. This de-energizes the relay R26 and opens the valve 128. The right brush controlled by that valve thereupon ceases to operate. The circuitry and operation thereof is similar to that of the left brush which was previously discussed in conjunction with the switches S8A and the hose switch $e$.

Continued advancement of the car brings its leading wheel to the control hose associated with the hose switch $h$ which causes the programmer A to step to its 10th position when closed. In this position the switch S13A closes which energizes the blower unit 134, and the blower unit 134 directs hot air onto the automobile as it passes through a drying tunnel. The switch S13A remains closed and the blower unit 134 remains in operation for the remainder of the cycle.

As the automobile continues to advance it closes the hose switches $i, j, k, l, m$, and $n$ in that order and in so doing causes the programmer A to step from its 10th position to its 16th position. As the programmer A moves into its 14th position the switch S6A opens and thereby shuts off the wash water valve 122 and the soap pump 120. As it passes into its 15th position it opens the switches S10A and S11A which in turn closes the rinse water valve 130 and stops the wax applicator 114, respectively. As the programmer A moves to its 16th position it closes the switch S14A which in turn places the go light 136 across the mains X and Y. The illumination of the go light signals the driver that he is no longer engaged by the conveyor and may leave the car wash installation.

As the car leaves the rear wheels pass over the hose associated with the hose switch m and close that switch. This causes the programmer A to step onto its next position which is position $l$, the arm position. Hence, the programmer A is in condition to track another vehicle through the wash installation.

The programmer B tracks the succeeding vehicle in a like manner only when the programmer A is tracking a vehicle in the wash. Likewise the programmer C tracks the third vehicle in a like manner only when the programmers A and B are occupied. Thus, the control system has the capability of tracking three vehicles simultaneously. Moreover, the washing and drying components are energized according to position so that the operation of the various components is independent of the conveyor speed. Also, the special services such as wax applications are fully automated and are commanded at the very outset, which is well ahead of the time they may be actually provided.

While the control system described has three interlocked programmers, two, or more than three may be utilized also.

This invention is intended to cover all changes and modifications of the example of the invention herein chosen for purposes of the disclosure which do not constitute departures from the spirit and scope of the invention.

What is claimed is:

1. A control system for an automatic vehicle washing installation having servicing components which are energized by electric signals and perform washing and similar operations on vehicles passing through the installation, said control system comprising: at least two programmers, each of which includes an actuator, drive means for moving the actuator upon receiving an electrical signal, and a plurality of switches which are opened and closed by the actuator pursuant to a predetermined schedule as the actuator moves, some of the switches being assigned to individual components to cause electrical energy to be directed to those components in accordance with the predetermined schedule, one of the switches on the first programmer being connected to further control the drive means of the second controller to enable the programmers to operate sequentially such that the first programmer will control the components to wash the first car which enters the wash installation and the second programmer will control the components to wash a subsequent car which enters the installation while the first car is still in the wash installation.

2. A control system according to claim 1 wherein those switches of the first programmer which control at least some of the servicing components are connected in parallel with corresponding switches of second programmer so that as to corresponding switches on the two programmers the operation of either one will energize the component with which those corresponding switches are associated.

3. A control system according to claim 1 wherein the actuators of both programmers are initially in an arm position in which first switches thereof are closed and are in circuit with the drive means; and wherein a second switch on the first programmer is in series with the first switch of the second programmer and is open when the actuator of the first programmer is in its arm position but closes after that actuator moves off of its arm position, whereby the first programmer will operate before the second programmer.

4. A control system according to claim 3 wherein the drive means of the programmers advance the actuators incrementally; and wherein each programmer further includes a plurality of contacts and a wiper which engages a different contact after each incremental move of the actuator, the wiper being connected in series with the drive means such that the drive means is energized when electrical current flows through the wiper, whereby the drive means will operate when the contact on which the wiper rests is energized, thereby advancing the wiper to the next contact.

5. A control system according to claim 4 wherein at least some of the corresponding contacts on the programmers are connected to switches which are closed by the passage of a vehicle through the wash installation so that the operation of the programmers and the servicing components controlled by the switches of the programmers is dependent on the position of the vehicle in the car wash installation.

6. A control system according to claim 1 wherein memory means are provided, which when energized conditions a circuit in which corresponding switches of the programmers exist so that when either of the corresponding switches is subsequently operated a servicing component associated with those corresponding switches will be energized, but when the memory means is not energized the servicing components associated with those components will not be energized, notwithstanding the subsequent closure of the corresponding switches.

7. A control system for an automatic vehicle washing installation having servicing components which are energized by electric currents and perform washing and similar operations on vehicles passing through the installation, said control system comprising: a start switch for creating a starting signal; position switch means along the path followed by the vehicles as they pass through the washing installation, the switch means being actuated by the vehicles, whereby the individual switch means are operated in sequence by a vehicle; at least two programmer means each of which is initially in an arm condition and is advanced from this condition by a starting signal derived from the start switch, each programmer means also being connected with and controlled by the position switch means after being advanced from its arm condition, each programmer means being further connected with the servicing components for commanding the servicing components to be energized, the one programmer means being interconnected with the other programmer means to isolate the other programmer means from the start switch when both of said programmer means are in the arm condition so that the first starting signal will cause only said one programmer means to advance and a subsequent starting signal originated when said one programmer means is away from its arm condition will cause said other programmer means to advance whereby the two programmer means will operate in sequence and will track different vehicles through the car was installation simultaneously.

8. A control system according to claim 7 and further characterized by memory means associated with the programmer means and at least one of the components and including a switch which when closed conditions the memory means to operate said one component upon receipt of a subsequent command from the programmer means.

9. A control system for an automatic vehicle washing installation having servicing components which are energized by electrical currents and perform washing and similar operations on vehicles passing through the installation, said control system comprising: position switch means along the path followed by the vehicles as they pass through the washing installation, the position switch means being actuated by the vehicles whereby the position switch means operate in sequence; a programmer connected with the position switch means and including an actuator which moves incrementally through successive positions when the position switches are operated by a vehicle passing through the installation, and program switches which are connected with the components for causing the components to be electrically energized; and a memory circuit associated with at least one of the components and at least a pair of the program switches and including a manually operated switch for activating the memory circuit, the one program switch of the pair being connected with the manually operated switch such that the manually operated switch is rendered effective to activate the memory circuit only at least one selected position for the actuator of the programmer, the other program switch of the pair being connected to said one component for allowing the component to be energized when the actuator is at a position subsequent to the position at which said one program switch renders the manually operated switch effective.

10. A control system according to claim 9 wherein the memory circuit further includes a relay switch which is energized when the manually operated switch is closed and when said one program switch in its closed position, the relay switch when closed completing a circuit between said one component and said other program switch; and wherein another program switch is connected in series with the relay switch and with a second set of contacts operated by the relay switch.

11. A control system for an automatic vehicle washing installation having servicing components which are electrically activated and are located along a path followed by vehicles as they pass through the installation, said control system comprising: position switch means located along the path followed by the vehicles and operated by the vehicles as they pass along the path, whereby the position switch means are operated in sequence; a start switch for providing an electric starting signal; and a programmer having a movable switch actuator, a plurality of program switches which are operated by the switch actuator as it moves, and drive means for advancing the switch actuator incrementally from an arm position to successive operating positions, the drive means being connected with the start switch for advancing the switch actuator from its arm position to its first operating position when a starting signal is received, the drive means further being connected to the position switch means for advancing the switch actuator to succeeding positions as the position switch means are operated so that the switch actuator will track a vehicle through the car wash installation, the program switches being connected to the servicing components for actuating those components in a predetermined sequence controlled by the switch actuator.

* * * * *